(12) United States Patent
Parsons et al.

(10) Patent No.: US 12,659,232 B2
(45) Date of Patent: Jun. 16, 2026

(54) POLICING NETWORK ELEMENT CONFIGURATION INJECTION

(71) Applicant: MICROSOFT TECHNOLOGY LICENSING, LLC, Redmond, WA (US)

(72) Inventors: James Duncan Parsons, Hatfield (GB); Dhaval Kiran Soneji, London (GB); George Arthur Blackburn, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 102 days.

(21) Appl. No.: 18/829,164

(22) Filed: Sep. 9, 2024

(65) Prior Publication Data
US 2026/0074954 A1     Mar. 12, 2026

(51) Int. Cl.
*H04L 41/0894*     (2022.01)
*G06F 8/71*     (2018.01)
*H04L 43/50*     (2022.01)

(52) U.S. Cl.
CPC ............ *H04L 41/0894* (2022.05); *G06F 8/71* (2013.01); *H04L 43/50* (2013.01)

(58) Field of Classification Search
CPC ........ H04L 41/0894; H04L 43/50; G06F 8/71
See application file for complete search history.

(56) References Cited

U.S. PATENT DOCUMENTS

| | | | | |
|---|---|---|---|---|
| 6,108,309 A * | 8/2000 | Cohoe | .................. | H04L 41/145 370/241 |
| 10,944,691 B1 * | 3/2021 | Raut | ....................... | H04L 45/64 |
| 11,777,835 B1 * | 10/2023 | Sedarat | ................. | H04L 43/045 370/252 |
| 2011/0188379 A1 * | 8/2011 | Calippe | .................. | H04L 41/12 370/241.1 |
| 2011/0188384 A1 * | 8/2011 | Ortega | .................... | H04L 12/28 370/254 |
| 2011/0267980 A1 * | 11/2011 | Calippe | ................. | H04W 24/02 370/254 |
| 2017/0366395 A1 * | 12/2017 | Goldfarb | ............. | H04L 12/4633 |
| 2018/0248769 A1 * | 8/2018 | Regmi | .................... | H04L 49/70 |

(Continued)

*Primary Examiner* — Phyllis A Book
(74) *Attorney, Agent, or Firm* — Han Gim; Newport IP, LLC

(57)     ABSTRACT

A method is disclosed comprising receiving a desired configuration for a network element, the network element comprising a current configuration and being in operation in a live communications network. Prior to injecting the desired configuration in the network element, the method comprises initiating creating a test instance of the network element having a configuration corresponding to the current configuration of the network element, and initiating injecting the desired configuration in the test instance of the network element, wherein the test instance of the network element provides a log in response to a deactivation of the configuration of the test instance during applying the desired configuration. The method comprises determining whether the deactivation of the configuration associated with the log is allowable using at least one rule, and in response to the deactivation of the configuration associated with the log being allowable, initiating injecting the desired configuration in the network element.

20 Claims, 6 Drawing Sheets

(56)            References Cited

U.S. PATENT DOCUMENTS

| | | | |
|---|---|---|---|
| 2018/0295019 A1* | 10/2018 | Magnusson | H04L 41/0886 |
| 2019/0044790 A1* | 2/2019 | Dickens | H04L 43/50 |
| 2020/0235991 A1* | 7/2020 | Shu | H04L 43/20 |
| 2021/0218652 A1* | 7/2021 | Raut | H04L 43/20 |
| 2022/0353143 A1* | 11/2022 | Hill | H04L 41/147 |
| 2023/0188414 A1* | 6/2023 | Kotalwar | H04L 41/0803 |
| | | | 370/254 |
| 2023/0188450 A1* | 6/2023 | Kotalwar | H04L 43/20 |
| | | | 709/224 |
| 2023/0412457 A1* | 12/2023 | Wang | H04L 41/12 |

* cited by examiner

1

POLICING NETWORK ELEMENT CONFIGURATION INJECTION

BACKGROUND

Network elements, especially in communications networks, often need to be controlled by a network infrastructure provider or operator. Examples of such network elements include session border controllers, firewalls, routers, and switches. Changes to network element configuration are made for many different reasons, such as maintenance, upgrade, configuration of services, troubleshooting and other reasons.

In some cases, network elements are configured by a manual login to an individual network element using a command line interface (CLI), which is time consuming and complex. Additionally, when applying changes manually over a plurality of network elements, configuration via a CLI is difficult to scale.

Moreover, some configuration changes require that a current network element configuration such as a Management Information Base (MIB) of a respective network element be deactivated in order to make a change. When such a current configuration is deactivated, traffic routed via the respective network element is in some cases dropped. In communications networks, this results in a loss of service, such as loss of a telephony service or other service, and can impact quality-of-service metrics by which a network infrastructure provider or operator may be bound.

The embodiments described below are not limited to implementations which solve any or all of the disadvantages of known ways of controlling network elements.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

Examples relate to policing network element configuration injection by testing injection of a desired configuration and evaluating deactivations of current configuration to determine whether to inject the desired configuration into a live network element.

In various examples, a method is disclosed comprising receiving a desired configuration for a network element, the network element comprising a current configuration and being in operation in a live communications network. Prior to injecting the desired configuration in the network element, the method comprises initiating creating a test instance of the network element having a configuration corresponding to the current configuration of the network element, and initiating injecting the desired configuration in the test instance of the network element, wherein the test instance of the network element provides a log in response to a deactivation of the configuration of the test instance during applying the desired configuration. The method comprises determining whether the deactivation of the configuration associated with the log is allowable using at least one rule, and in response to the deactivation of the configuration associated with the log being allowable, initiating injecting the desired configuration in the network element.

2

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
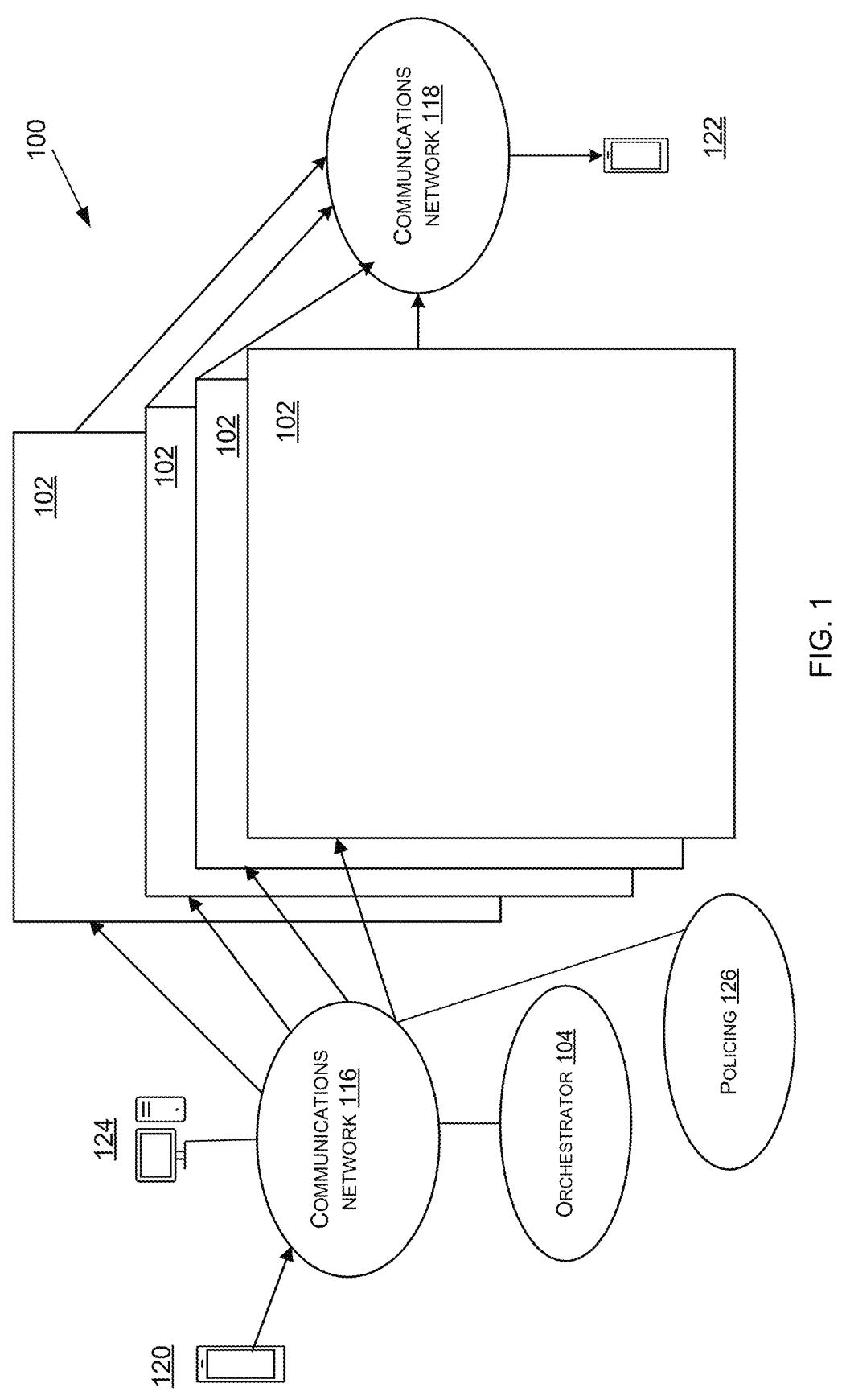
FIG. 1 is a schematic diagram of a plurality of network elements in a communications network.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

As mentioned above, network elements such as session border controllers, firewalls, routers and/or switches often need to be controlled by a network infrastructure provider or operator. Increasingly, network element functionality is deployed using containers, where a container is software together with any libraries, dependencies and configuration files needed to execute the software. A container is portable between computing environments in that it is able to execute on different computing environments that it is ported between. A software container is independent of its computing environment. In cases where a network element comprises a container, the container often needs to be controlled.

In an approach, a declarative configuration is provided to a network element, in some cases being provided to a container of the network element, or a virtual machine deploying the network element, or another computing entity deploying the network element. A declarative configuration defines a high-level desired state to be reached, where a receiving computing entity determines, in some approaches, how to achieve the state of the declarative configuration.

In contrast, in other approaches, an imperative configuration is provided to a network element, in some cases being provided to a container of the network element. An imperative configuration defines specific, lower-level configuration than a higher-level declarative configuration, comprising instructions for example to update a field in a specified way or to set a value of a parameter.

Using declarative configuration is more scalable than in approaches where a manual login to a CLI is required to adjust configuration of, or where imperative configuration is provided to, a network element. This is because a declarative configuration can be applied to a plurality of network elements without specifically tailoring instructions to each individual network element, and/or without risking introducing errors and inconsistencies especially between network elements that have had their configurations adjusted and those that have not.

Network elements in various approaches comprise a current configuration, in some cases a MIB and in some cases the configuration being a low-level configuration, referring to the configuration being directly interpretable by computer hardware rather than being interpretable easily by humans. The current configuration defines variables and parameters, and enables functionality of the network element. In some cases, a network element comprises a plurality of current configurations, such as modules of current configuration, for example that enable different functionalities of the network element, in some examples each current configuration being a low-level configuration. Low-level configuration in this context refers to configuration interpretable by computer hardware, defining specific variables and parameters used by the network element and/or by traffic routed via (including being destined for) the network element.

Though such a current configuration in various examples is adjusted using an imperative configuration, in an approach, a declarative configuration is provided to a network element, and the declarative configuration is mapped to an imperative configuration suitable for adjusting the current configuration of the network element to converge to the state defined by the provided declarative configuration.

Configuration is injected into a network element, in some cases into a container of the network element or a virtual machine of the network element, where injection refers to providing and applying the configuration. For example, a declarative configuration being injected in a network element refers to the declarative configuration being provided to the network element, mapped to an imperative configuration, and the imperative configuration being applied to the network element such that the network element is configured as defined by the imperative configuration.

As mentioned above, some configuration changes require that a current configuration (or a plurality of current configurations) be deactivated in order to make a change. When such a current configuration is deactivated, traffic routed via the respective network element is in some cases dropped. A high number of current configuration deactivations or a current configuration being deactivated for a long time therefore can result in a large volume of traffic being unable to function. Where the traffic is part of a telecoms service such as for providing voice calls many calls may be unable to proceed where such calls in a communications network are routed via a session border controller with a deactivated current configuration.

Deactivation of a configuration refers to the functionality and/or parameters and variables being unable to be used by an entity associated with the configuration. For example, a network element with a deactivated current configuration is unable to recognize instructions in traffic arriving at the network element where definitions enabling the recognition of the instructions are within the deactivated current configuration.

In various examples described herein, a method of policing network element configuration injection, i.e. whether a received configuration should be injected in a network element, is provided. A test instance of a network element is initiated to be created prior to injecting a received configuration, and then injection of the received configuration in the network element of the test instance is initiated. This provides a way of testing the received configuration prior to injecting it in the actual network element. The test instance facilitates safety because it enables testing of what will happen on the live system (such as a live telephony service) without affecting the live system. By creating a test network element in a live environment it is possible to observe what proposed changes will bring and adjust them before they are implemented. A test instance of a network element may be created, have a specified configuration applied to it, and then subsequently another configuration applied. Logs from a configuration injector of the test instance are produced during the application of the configurations and the logs are analysed to quantify a likely effect on live traffic by observing deactivation events in the log.

The network element of the test instance is configured to provide a log in response to a deactivation of a current configuration, which enables the provision of information on a volume of deactivations and/or a length of time of deactivation, among other information. Using at least one rule, it is then determined whether the deactivation of the current configuration associated with a log is allowable, and if so, the configuration is injected in the network element. By determining whether a deactivation of a current configuration, or in some cases whether deactivation of a number of current configurations, is acceptable, prior to injection of the configuration in a network element, deactivations of current configuration that would result in unacceptable drops of traffic routed via the network element are eliminated. A stability, reliability, security and quality of service of the network element are therefore improved.

The initiating creation of a test instance and initiating injecting a desired configuration in the test instance, alongside the determining whether a deactivation of current configuration associated with a log is allowable of the disclosure operate in an unconventional manner to achieve an improvement in stability, reliability and quality of service of a network element of the disclosure.

The initiating creation of a test instance and initiating injecting a desired configuration in the test instance, alongside the determining whether a deactivation of current configuration associated with a log is allowable improve the functioning of an underlying computing device by providing a way to police network element configuration injection.

FIG. 1 is a schematic diagram of a plurality of network elements 102 in a communications network 100 such as a wired or wireless communications network for transmitting packet-based communications such as voice over internet protocol calls. The communications network is a 5G telecommunications network in some cases, and for example the network elements 102 are telephony network elements or other network elements of a complex communications network. The communications network 100 comprises a first communications network 116 and a second communications network 118 and in this example the network elements link the first communications network 116 to the second communications network 118 such as where the network elements are session border controllers (SBCs). However, the network elements may be of other types, such as but not limited to, firewalls, routers, switches. The network elements may be located anywhere in the communications network 100 according to a particular function or use case of the network elements. Each network element is computer hardware, in some cases executing a container implementing functionality of the network element.

One or more end user communication devices are shown including smart phones 120, 122 and desktop computer 124 to illustrate that calls may be established over the communications network 100 between end user communication devices. Other types of end user communication device may be used.

An orchestrator 104 is in various examples connected to the communications network 100. The orchestrator is computer implemented functionality for controlling instantiation of containers, deleting containers, and configuring containers. The orchestrator in various examples receives input from a network operator or infrastructure provider via one of the end user devices such as desktop computer 124 in order to specify how network services are to be orchestrated. By using the orchestrator 104 it is possible to have the orchestrator send configuration files i.e. a configuration, to the network elements 102. In cases where a network element 102 comprises a container, the orchestrator 104 is used to send a configuration to the container of the network element 102.

A policing node 126 is in various examples connected to the communications network 100. The policing node is computer implemented functionality for policing network element configuration injection, i.e. whether a received configuration should be injected in a network element.

The configuration files specify desired configuration to be deployed in the communications network 100. A configuration file is written in a declarative form comprising a statement of a desired configuration (rather than a list of actions to take to reach the desired configuration). When a network element 102 which is designed to operate using imperative configurations receives a configuration file, the network element converts the declarative form of the configuration file into an imperative form in order to be able to attain the configuration specified in the configuration file.

In various examples, the imperative configuration is applied to or via a CLI of a network element or container, and in other examples is applied directly to a current configuration such as an MIB of a network element or container.

In an approach, a configuration of the network element 102 is read each time a configuration file is received by the network element 102, in some cases from the orchestrator 104. A difference between the received configuration file and the read configuration may then be computed in order to be able to convert the difference into imperative form.

In some examples, the network element 102 comprises a configuration injector configured to receive a desired configuration, and apply the desired configuration to the network element 102. In some cases, the configuration injector is arranged to store a record of a configuration of the network element 102, compute a difference between the configuration of the network element 102 and the desired configuration, in some cases map a declarative desired configuration to an imperative desired configuration, and subsequently to send an imperative configuration to the network element for application. In some cases, the configuration injector applies the desired configuration to the network element.

In other cases, where the network element comprises a container, the container comprises a configuration injector with the same nature as outlined with respect to the network element 102 but that is configured to apply a received desired configuration to the container of the network element 102.

By enabling the configuration injector to store configuration it is possible for the configuration injector to compute the difference without having to read the configuration from the network element or container, which provides efficiency gains and reduces latency. In examples, each of the configuration injectors is arranged to update its record of the network element or container configuration in response to sending configuration in imperative form to the network element or container. This improves accuracy of the record of the configuration and reduces the need to read the configuration for every injection.

During applying a desired configuration to a network element 102, in some cases, a current configuration may need to be deactivated in order for the network element configuration to be changed. All current configurations, such as all modules of current configuration, may need to be deactivated in some cases, or in other cases only a portion of total current configurations may need to be deactivated. Traffic routed via the respective network element 102 or container comprised in the network element 102 is therefore in some cases unable to be dealt with and/or is dropped.

Figure 2:
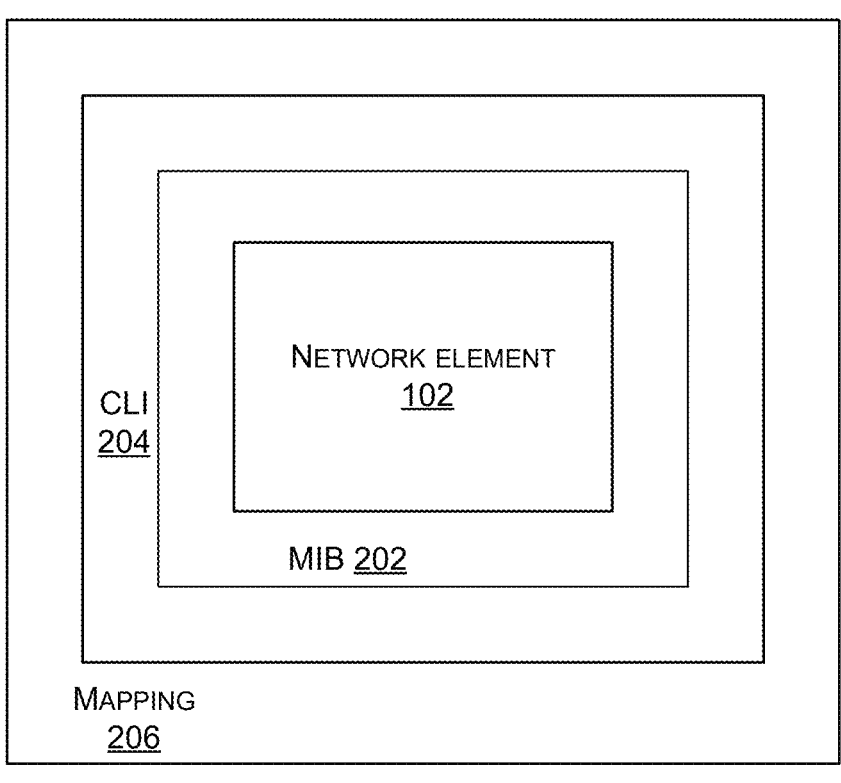
FIG. 2 is a schematic diagram of two network elements with adjustable configuration.
Figure 2:
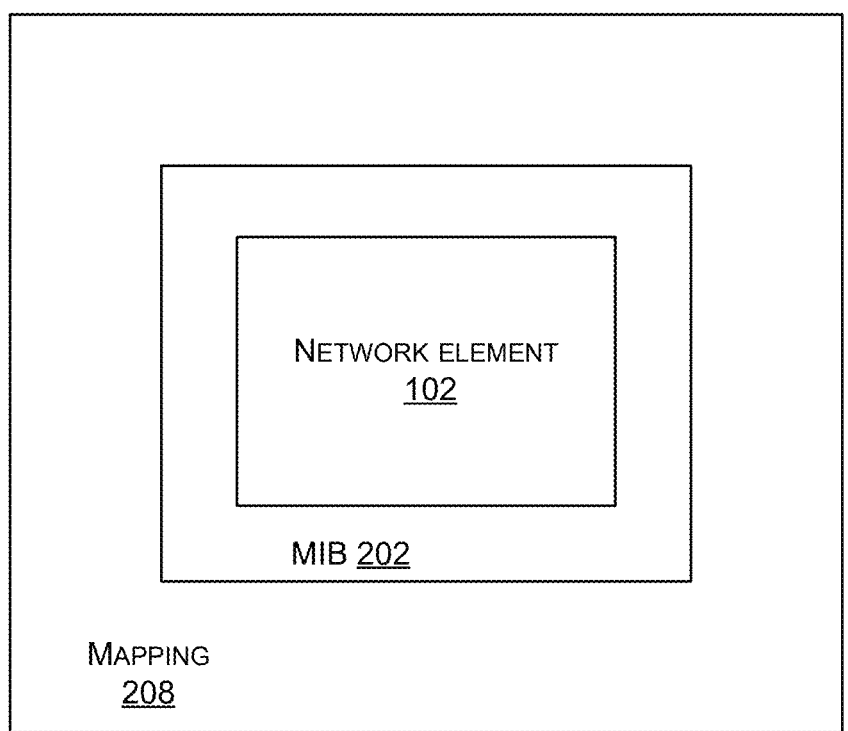

FIG. 2 is a schematic diagram of two network elements 102. It illustrates how a configuration is applied to a network element 102. In the upper part of FIG. 2 the network element 102 is implemented using MIB 202, which is a current configuration. The network element 102 and the MIB 202 is wrapped with a command line interface 204 to enable human engineers to use the CLI 204 to send commands and receive responses from the network element 102, such as to configure the network element. The network element 102 operates using imperative instructions since the MIB 202 is configured to be adjusted imperatively. The MIB 202 is in various examples a low-level configuration i.e. a configuration applied directly to computing hardware.

The CLI 204 is also formed using imperative code. A mapping layer 206 around the CLI 204 is software that maps between a declarative configuration file and imperative CLI instructions. In order to control the network element 102 in the example of the upper part of FIG. 2, a declarative configuration file is mapped by mapping layer 206 into imperative CLI 204 instructions. The CLI instructions update MIB 202 which updates configuration of the network element 102. In an example the network element 102 is a session border controller (SBC) and the configuration is changed for example in order to change how the SBC treats packets travelling between the first and second communications networks of FIG. 1. In another example the network element 102 is a firewall and the configuration is changed for example in order to change which packets the firewall blocks travelling between the first and second communications networks of FIG. 1.

In the lower part of FIG. 2, the network element 102 is again implemented using MIB 202, but in an alternative approach to the upper part of FIG. 2, there is no CLI layer, and a mapping layer 208 maps a received declarative configuration into an imperative configuration which is directly applied to the MIB 202. In this way, the CLI layer is bypassed.

In both situations, a received configuration is applied to a network element. As mentioned above, injection of a configuration refers to providing and applying the configuration, and so the illustrated mapping 206 between CLI 204 and MIB 202 or the mapping 208 to MIB 202 process are examples of how an injection of configuration is enabled. In various examples, a mapping 206, 208, and in some cases a provision of CLI 204 instructions to a CLI of a network element 102 or container, are performed by a configuration injector.

In various examples, the network element 102 comprises a container, and the MIB 202 relates to the container of the network element 102, where the mappings 206 and 208 map declarative instructions to imperative CLI 204 instructions or an imperative configuration that is directly applied to the MIB 202, respectively. CLI 204 is used in container examples to control the container of the network element 102.

Figure 3:
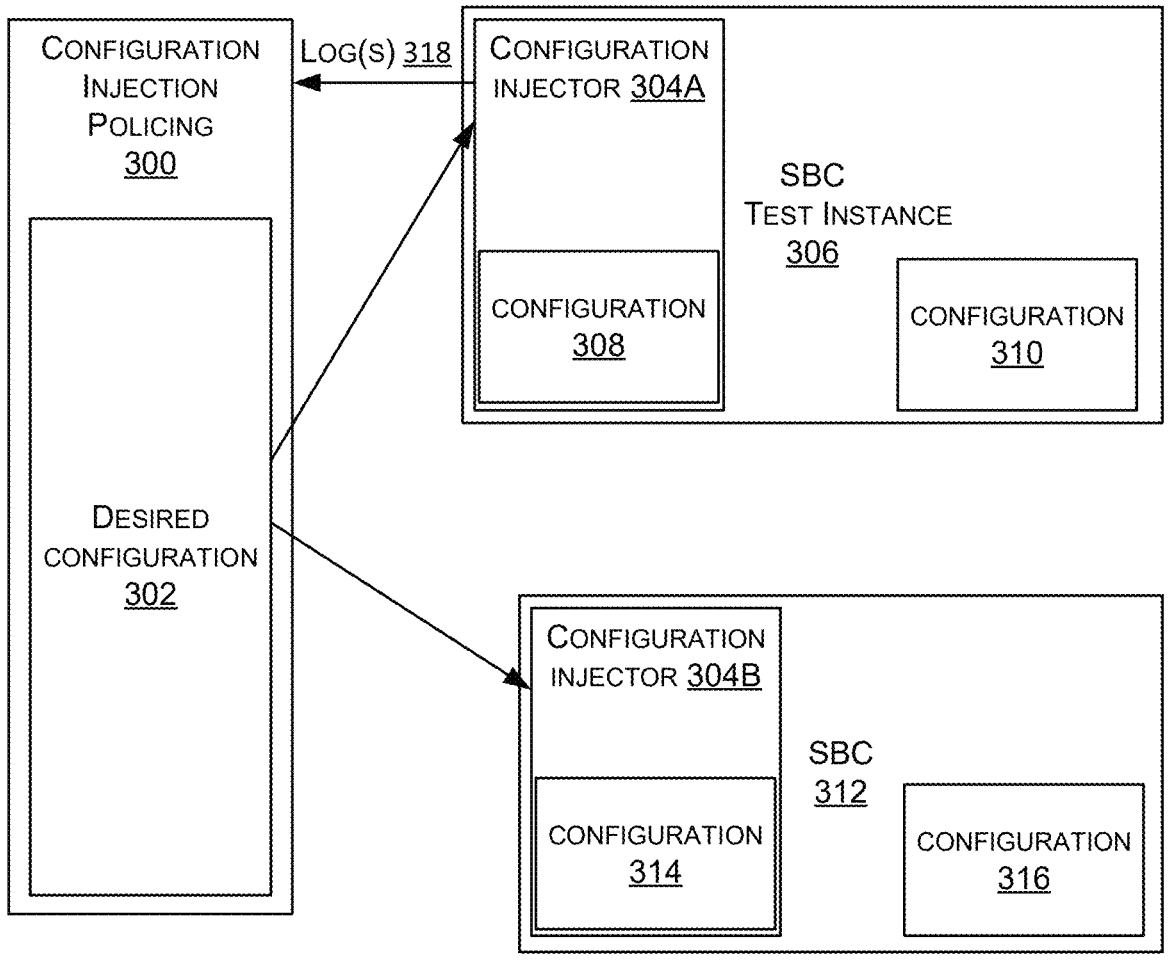
FIG. 3 is a schematic diagram of a network element which is a session border controller and which has a desired configuration policed prior to injection of the configuration in the network element.

FIG. 3 is a schematic diagram of a network element which is a session border controller 312 and which has a desired configuration 302 policed during configuration injection policing 300, prior to injection of the desired configuration 302 in the session border controller 312. It should be appreciated that, although FIG. 3 relates to a session border controller 312, in various examples this is another network element, in some cases a telephony network element, such as a firewall, switch, router, or any other network element.

An apparatus implementing configuration injection policing 300 receives a desired configuration 302 for the SBC 312, which comprises i.e. has a current configuration 316.

Prior to injecting the desired configuration 302 in the SBC 312, the configuration injection policing 300 method initiates creation of a test instance 306 of the SBC 312. Creation of a test instance 306 of a network element is in various examples performed by creating a virtual machine reflecting the network element, creating a container reflecting the network element, or via any other method. In some cases, initiating creation of a network element refers to instructing an orchestrator to create the test instance, for example a container. In some cases, initiating creation of a network element comprises instructing a hypervisor to create virtual machine instantiating the network element.

In various examples, test instance 306 is implemented on a same hardware device that implements the element itself, i.e. SBC 312. In other examples, the test instance 306 is implemented by a hardware device that is independent of the hardware device that implements the element itself i.e. SBC 312.

A test instance of a network element is a copy of functionality of the network element deployed using a virtual machine, a compute entity or software container. A test instance of a network element does not receive live network traffic of a communications network where the test instance is deployed. Traffic may be packets of data relating to calls in progress in a communications network. In various examples, the test instance of the network element is created such that it has a same configuration as a live network element that it is a test instance of, and in other cases is created such that it has a same function as a live network element that it is a test instance of. The test instance is created such that applying a desired configuration to the network element of the test instance deactivates the same configuration of the network element of the test instance as would be deactivated should the desired configuration be applied to the corresponding live network element.

In cases wherein the live network element comprises a first container that enables live functionality of a network element, the test instance is in some cases a second container of the same live network element but wherein the second container is not live i.e. does not receive live network traffic, or is a container of a different network element or other hardware device.

Once the test instance 306 of the SBC 312 is created, the desired configuration 302 is initiated to be injected in the test instance 306. As mentioned above, in various examples this comprises instructing an orchestrator to provide the desired configuration 302 to a test instance of a network element, the test instance being a second container where the network elements comprises a first container. In other examples, the desired configuration 302 is injected in the test instance 306, i.e. by providing and applying the desired configuration 302 to the test instance 306.

In an example, configuration injection policing 300 is performed prior to the desired configuration 302 being provided to an orchestrator that is configured to communicate with the live network element i.e. SBC 312, such that a test instance 306 is created prior to the provision of the desired configuration 302 to the orchestrator.

In various examples, the orchestrator is, non-exhaustively, Kubernetes (trade mark), Docker Swarm (trade mark), AWS CloudFormation (trade mark), Terraform (trade mark), Ansible (trade mark), Puppet (trade mark), Salt (trade mark).

In some cases, configuration injection policing 300 is performed in a Continuous Integration/Continuous Delivery (CI/CD) pipeline, which refers to a development pipeline in which changes such as configuration adjustments made by engineers are provided, merged, tested, and deployed automatically and continuously.

The test instance 306, once created, comprises a current configuration 310, which in some cases is equivalent to a current configuration 316 of the live network element i.e. SBC 312.

Additionally, as mentioned previously, a network element i.e. SBC 312, in various examples comprises a configuration injector 304B, which in some cases stores a view of the configuration 314 that reflects the current configuration 316 of the element. Having the stored view of the configuration reduces latency during injection of a desired configuration. This is because the stored view is immediately available and does not have to be read from the network element current configuration 316 which is time consuming.

In various examples, the test instance 306 also comprises a configuration injector 304A, which in some cases stores a view of the configuration 308 that reflects the current configuration 310 of the test instance 306. In this way, the test instance 306 of the SBC is configured in a same way as the live SBC 312.

The test instance is configured to provide a log 318 in response to a deactivation of a current configuration 310 of the test instance 306, in some cases by the configuration injector 304A being configured to provide a log 318 in response to a deactivation of a current configuration 310 of the test instance 306. In some examples, the test instance 306 and/or the configuration injector 304A are configured to provide a log after injecting the desired configuration 302, in various examples regardless of whether there were deactivations of the current configuration 310.

Such a log 318 in various examples is a plurality of logs. The log 318 comprises an indication of a deactivation of the current configuration 310. In cases wherein the current configuration 310 is one of a plurality of current configurations, for example wherein the total current configuration of the test instance 306 comprises modules or portions each being a current configuration, the log 318 comprises an indication of a deactivation of a current configuration.

The log 318 in some cases provides an indication of a volume of deactivations of a current configuration 310, a length of time of a deactivation of a current configuration 310, a frequency of deactivations, and/or additional information regarding a deactivation of a current configuration 310.

The log 318 is obtained in some cases by the configuration injector 304A monitoring the current configuration 310 during applying the desired configuration 302 during injection, or in other cases the test instance 306 is configured to generate a log by monitoring its own operations including deactivations of current configuration. In various examples, a log 318 is written to a file storage location that is shared with an apparatus implementing the configuration injection policing 300 method according to the technology described herein. In other examples, the log 318 is provided, in some cases via an intermediate entity, to the apparatus implementing the configuration injection policing 300, in some cases using a communications network.

The log 318 is in various examples provided to the entity implementing the configuration injection policing 300. In some cases, this is an orchestrator in communication with the live network element 312, is the live network element 312 itself, is a configuration injector 304B in the live network element 312, or is an independent entity. In some examples, the live network element i.e. SBC 312 and/or the test instance 306 are configured to always converge on a desired configuration that is injected. This means that, should the SBC 312 or the test instance 306 receive a configuration during injection that results in a deactivation of current configuration 310, 316, this will still result in the desired configuration being applied, i.e. there is no policing of deactivations at the SBC 312 or the test instance 306 itself.

The configuration injection policing 300 mechanism then determines whether a deactivation of the current configuration 310 of the test instance 306 associated with the received log 318 is allowable using at least one rule, and, in response to the deactivation being allowable, initiates injecting the desired configuration 302 in the live network element i.e. SBC 312, in various examples by providing the desired configuration 302 to the configuration injector 304B. In some cases, configuration injection policing 300 mechanism injects the desired configuration 302 in the live network element i.e. SBC 312, in response to the deactivation being allowable. The rule may be defined by an operator or may be configured during manufacturing. In some cases the rule is dynamically adjustable during operation by an operator or automatically according to specified criteria. In some cases, a rule comprises a consequence of a user decision, where the rule is, for example: 'IF user approves, inject'. Where the rule comprises a user decision, in various examples, the user is presented with a consequence of injecting configuration, such as an indication of a deactivation of current configuration, and the user is left to make a decision on whether to approve or not of the injection. In an example the rule is an IF THEN rule where the IF condition uses criteria about the log 318 and the THEN part of the rule specifies an action to either allow the deactivation or not. In an example, where the log indicates that more than about 10% of traffic will be dropped the rule indicates that deactivation is not allowed whereas if about 10% or less of traffic is dropped deactivation may proceed. In some cases the log is assessed using a binary classifier trained to classify the log 318. The binary classifier may be trained using supervised learning such as by having historical log data classified by humans used as training data.

In response to the deactivation being unallowable, in some cases injection of the desired configuration 302 in the live network element i.e. SBC 312 is prevented. Additionally or alternatively, in response to the deactivation being unallowable, injection of the desired configuration 302 in the live network element i.e. SBC 312 is delayed, for example until no traffic is routed to or via SBC 312, and/or until a low traffic period for the SBC 312 (such as a predicted low traffic period, for example a time from 11 pm to 3 am. Additionally or alternatively, in response to traffic being unallowable, in some cases traffic is initiated to be transferred to a different live network element, the desired configuration 302 is initiated to be injected, and, after injection, traffic is initiated to be transferred back to the live network element SBC 312.

Figure 4A:
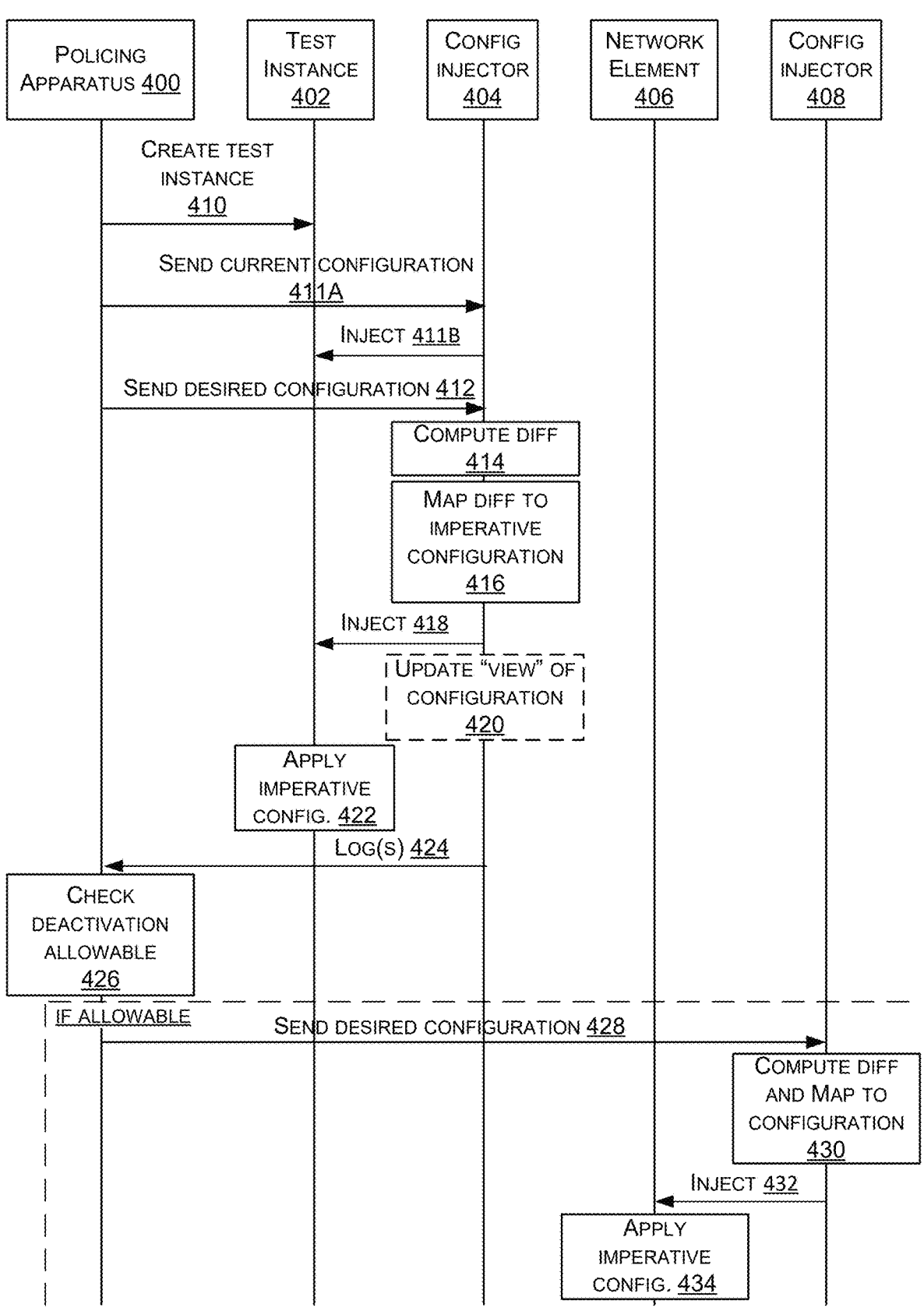
FIGS. 4A and 4B are flow diagrams of a method performed to police desired configuration prior to injecting the desired configuration into a network element.
Figure 4B:
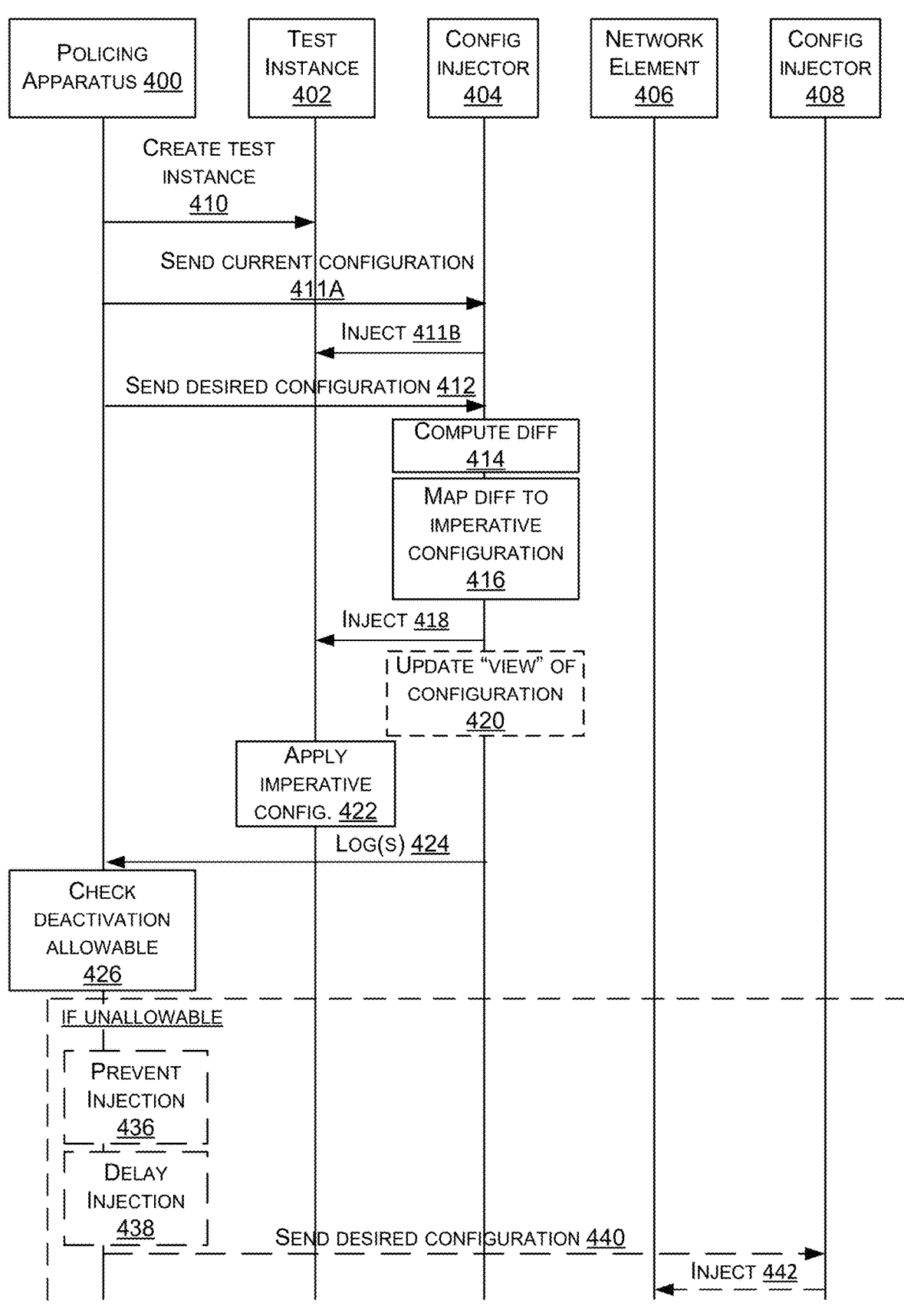

FIGS. 4A and 4B are flow diagrams of a method performed to police desired configuration prior to injecting the desired configuration into a network element, where the illustrated methods correspond to those described with respect to the configuration injection policing 300 of FIG. 3.

In FIG. 4A, computer implemented policing apparatus 400, which in various examples is comprised in a communications network further comprising the network element 406, receives a desired configuration for the network element 406. Policing apparatus 400 is a communications network node with functionality as described herein. In various examples the policing apparatus 400 intercepts the desired configuration intended for network element 406, and in other examples is provided with the desired configuration, such as part of a CI/CD pipeline.

Policing apparatus 400 initiates the creation of a test instance 410 of the network element 406, prior to injection 432 of the desired configuration in the network element 406. In various examples, such a creation of a test instance is performed by an orchestrator, and in some cases the test instance is a container. In other cases the test instance is software instantiated on a virtual machine or other compute entity. The policing apparatus 400 initiates the creation of a test instance by sending instructions to a computing entity such as an orchestrator, hypervisor or other computing entity.

The network element 406 comprises a current configuration, and the test instance 402 also comprises a current, in various examples different or equivalent to the configuration of the network element 406, configuration. In various examples, the test instance 402 is provided with its current configuration by the policing apparatus 400 sending a current configuration 411A to a configuration injector 404 of the test instance 402, though in other examples the test instance 402 comprises a default configuration or is configured in another way. The configuration injector 404 then injects 411B the current configuration in the test instance 402. As such, in various examples, the test instance 402 is injected with a current configuration of the live network element 406, in some cases being an SBC such as SBC 312 of FIG. 3. This injection of the current configuration in the test instance 402 is performed prior to testing injection of desired configuration, i.e. prior to sending the desired configuration 412.

The policing apparatus 400 then initiates injecting the desired configuration in the test instance 402, such as by sending the desired configuration 412 to a configuration injector 404 of the test instance 402. A configuration injector is computer implemented functionality to receive declarative configuration, convert that to imperative configuration, and send the imperative configuration into a computing entity such as a container, virtual machine or other computing entity. In some cases, the desired configuration is a declarative configuration. The configuration injector 404, in various examples, computes a difference 414 between a current configuration of the test instance 402 and the desired configuration, and maps the difference to an imperative configuration 416 which is applicable by the test instance 402. The configuration injector then injects 418 the desired configuration, in some cases an imperative configuration corresponding to the desired configuration, in the test instance 402. In some cases, the configuration injector 404 updates its view of the current configuration 420 of the test instance 402.

The test instance 402 then, as part of the injection 418, applies the imperative configuration 422. The test instance 402 is configured to provide a log 424 in response to a deactivation of a current configuration during applying the desired configuration 422. In various examples this provision of a log refers to the configuration injector 404 of the test instance 402 providing a log 424 to the policing apparatus 400.

The policing apparatus 400 then checks whether the deactivation of a current configuration of the test instance 402 associated with the received log 424 is allowable 426 using at least one rule. It should be noted that in some cases the log 424 is stored by the test instance 402 and is accessed by the policing apparatus 400, rather than being provided directly to the policing apparatus 400.

The at least one rule refers in various examples to a defined at least one condition under which a deactivation of a current configuration i.e. a configuration prior to injection of the desired configuration, is allowable. In various examples, a deactivation falling outside of the at least one rule is unallowable. In other examples, the at least one rule defines unallowable deactivations of a current configuration, and in some cases a deactivation falling outside of the at least one rule is allowable. In other examples, the at least one rule defines both allowable and unallowable conditions.

Examples of such rules include, but are not limited to: "If a deactivation lasts more than 5 seconds, not allowable", "If a volume of deactivations per second is greater than 5 deactivations per second, unallowable", "If a volume of current configurations deactivated is less than 3, allowable", "If a current time is between 9 am and 5 pm, unallowable", and/or "If current configuration A is deactivated but current configuration B is not deactivated, allowable". It is appreciated that the above examples are in natural language, and that in practice the at least one rule is in some cases programmatically defined or defined in any other way.

Additionally, in some cases the at least one rule is at least two rules, wherein at least two rules are interrelated, for example: "Rule 1: If a volume of deactivations is 3, go to rule 2. Rule 2: If the present time is earlier than 5 pm, unallowable". It should be noted that the numbers, times, and metrics described herein are in no way limiting, and that in various examples any other metrics, numbers, and times are used.

The at least one rule is used to determine whether a deactivation is allowable by comparing the deactivation indicated in the log 424, in some cases the deactivations indicated in the logs 424, to the at least one rule.

The at least one rule, in addition to defining at least one condition related to a deactivation indicated by the log, in various examples define a condition associated with the network element 406 to which the test instance 402 relates. For example, the at least one rule in some cases includes, but is not limited to, rules such as: "If a number of calls in progress that are routed via the network element to which the test instance relates is greater than 3000, unallowable".

The at least one rule in various examples defines a class of traffic that is not allowed to be interrupted, i.e. where a deactivation of current configuration is unallowable if the deactivation would affect a class of traffic. Such a class in some cases includes emergency calls via a telecommunications network, and/or traffic related to government agencies.

In response to the deactivation of a current configuration associated with a log 424 being allowable, the policing apparatus 400 initiates injecting the desired configuration in the network element 406. In various examples, as outlined above, this injection involves sending the desired configuration 428 to a configuration injector 408 associated with the network element 406, where the configuration injector 408 in various examples computes a difference and maps a declarative desired configuration in some cases to an imperative configuration 430, before injecting 432 the desired configuration in the network element 406.

The network element 406, as part of the injection of the desired configuration, applies in various examples the imperative configuration 434. After this, the network element 406 is configured in a desired way.

FIG. 4B illustrates the same first portion of a method according to FIG. 4A, and refers to the same elements 400-426. However, FIG. 4B illustrates, in various examples, a method in response to a deactivation of a current configuration associated with a log 424 being unallowable.

In some cases, the policing apparatus 400, in response to a deactivation being unallowable, prevents injection 436 of the desired configuration in the network element 406. In other cases, the policing apparatus 400 delays injection 438 of the desired configuration in the network element 406, for example until less traffic is predicted to be or is routed via the network element 406 than at the time that a deactivation was determined to be unallowable 426. Once a delay time is exceeded, the policing apparatus 400 in an example initiates injection of the desired configuration in the network element 406, such as by sending the desired configuration 440 to a configuration injector 408 associated with the network element 406. The configuration injection 408 then injects 442 the desired configuration.

As outlined with respect to FIG. 4A, the configuration injector 408 in some cases computes a difference, maps a declarative configuration to an imperative configuration and then injects the imperative configuration in the network element 406, which applies the imperative configuration.

The functionality of the policing apparatus 400 described herein is performed, additionally or alternatively, at least in part by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 5:
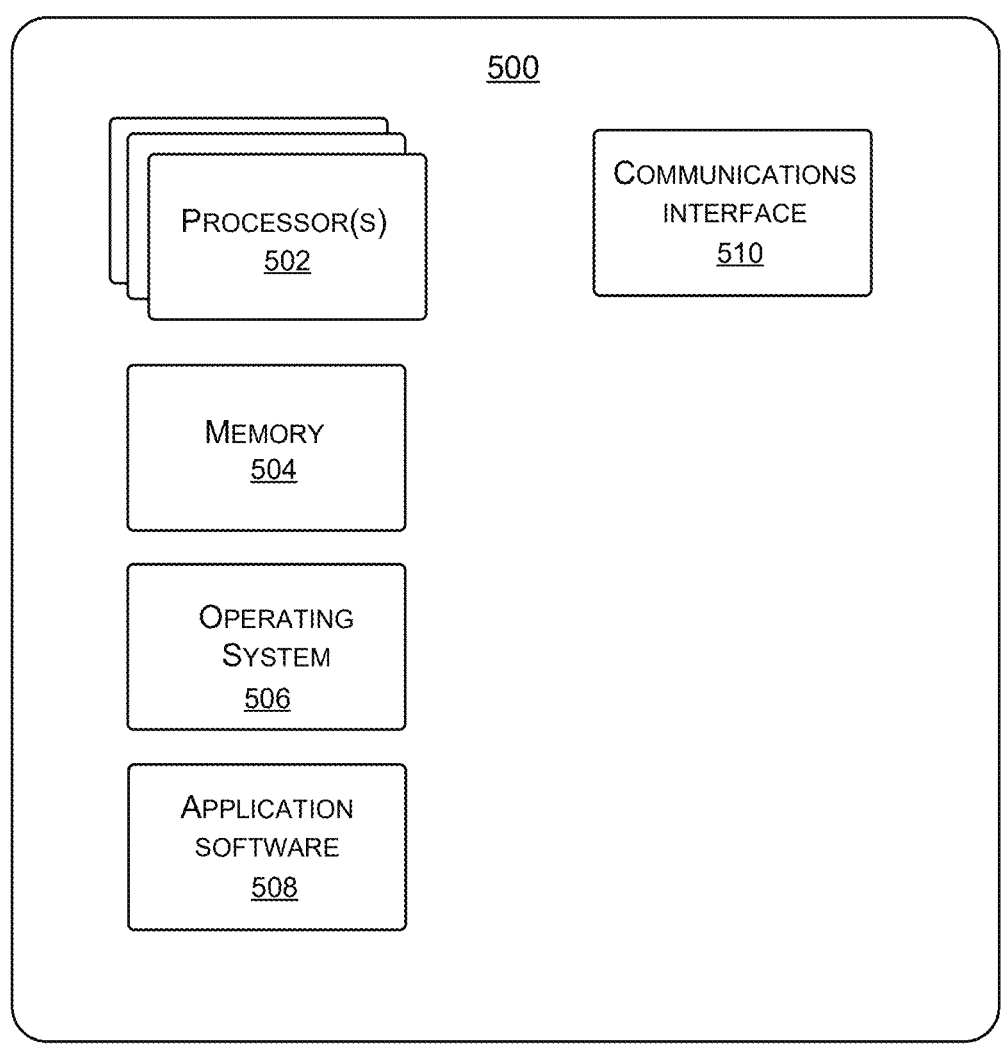
FIG. 5 illustrates an exemplary computing-based device in which embodiments of the disclosed technology for policing network element configuration injection are implemented.

FIG. 5 illustrates various components of an exemplary computing-based device 500 which are implemented as any form of a computing and/or electronic device, and in which embodiments of the disclosed technology for policing network element configuration injection are implemented in some examples.

Computing-based device 500 comprises one or more processors 502 which are microprocessors, controllers or any other suitable type of processors for processing computer executable instructions to control the operation of the device in order to police network element configuration injection. In some examples, for example where a system on a chip architecture is used, the processors 502 include one or more fixed function blocks (also referred to as accelerators) which implement a part of the method described with respect to FIGS. 3, 4A and 4B in hardware (rather than software or firmware). Platform software comprising an operating system 506 or any other suitable platform software is provided at the computing-based device to enable application software 508 to be executed on the device.

The computer executable instructions are provided using any computer-readable media that is accessible by computing based device 500. Computer-readable media includes, for example, computer storage media such as memory 504 and communications media. Computer storage media, such as memory 504, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 504) is shown within the computing-based device 500 it will be appreciated that the storage is, in some examples, distributed or located remotely and accessed via a network or other communication link (e.g. using communication interface 510).

Computing based device 500 in various examples is comprised in a communications network that further comprises a network element. In some cases, computing based device 500 is an orchestrator configured to communicate with a network element, is an orchestrator configured to create a test instance of the network element, is a network element, or is an entity that is independent of the network element of which the test instance of the herein disclosed technology is created and that is independent of an orchestrator.

In various example, communications interface 510 is used to initiate creation of a test instance and/or to initiate injection of configuration in a test instance and/or in a network element.

Alternatively or in addition to the other examples described herein, examples include any combination of the following:

Clause A. A method for policing network element configuration injection, comprising:

receiving a desired configuration for a network element, the network element comprising a current configuration and being in operation in a live communications network;

prior to injecting the desired configuration in the network element, initiating creating a test instance of the network element in the live communications network, the test instance of the network element having a configuration corresponding to the current configuration of the network element;

initiating injecting the desired configuration in the test instance of the network element, wherein the test instance of the network element provides a log in response to a deactivation of the configuration of the test instance during applying the desired configuration;

determining whether the deactivation of the configuration associated with the log is allowable using at least one rule;

in response to the deactivation of the configuration associated with the log being allowable, initiating injecting the desired configuration in the network element. In this way, a method is provided that reduces instances of dropped traffic by a network element, by enabling policing of injection of desired configuration, and therefore allowing injection where this would result in acceptable deactivations of current configuration of the element.

Clause B. The method of Clause A, wherein the desired configuration is a declarative configuration. In this way, the provided method deploys declarative configuration, enabling scalability when applying configuration to a plurality of network elements, whilst still providing a way of policing injection of the configuration.

Clause C. The method of Clause B, wherein the network element is configured to map the declarative configuration to an imperative configuration for configuring the network element. In this way, the provided policing mechanism is compatible with network elements that support imperative configuration.

Clause D. The method of any preceding Clause, wherein the network element is a telephony network element. In this way, a telephony network element has related configuration injection policed, which enables the reducing of dropped calls within a telephony network.

Clause E. The method of any preceding Clause, wherein the first network element comprises a first container, wherein the current configuration is associated with the first container, wherein the test instance of the network element is a second container, wherein injecting configuration in the test instance of the network element refers to injecting configuration in the second container, and wherein injecting configuration in the network element refers to injecting configuration in the first container. In this way, an efficient way of initiating a test instance of the network element is provided.

Clause F. The method of Clause E, wherein the method is performed in a Continuous Integration/Continuous Delivery, CI/CD, pipeline, and wherein the initiating the creating test instance of the network element is performed prior to the desired configuration being provided to an orchestrator that is configured to communicate with the network element. In this way, the provided policing mechanism is incorporated into an automated development pipeline which is scalable and efficient, and creation of the test instance is performed before transmission of the desired configuration via an orchestrator which reduces unneeded traffic where the desired configuration is not allowable to be injected.

Clause G. The method of any preceding Clause, wherein the network element is configured to always converge on a desired configuration injected in the network element. In this way, the network element will always implement the desired configuration, enabling policing to be separated from the network element for scalability and efficiency and providing a way to configure the network element even when such configuration would reduce in deactivations, where such deactivations are deemed to be allowable by the policing mechanism.

Clause H. The method of any preceding Clause, further comprising in response to the deactivation of the current configuration associated with the log being unallowable, performing at least one of: preventing injection of the desired configuration in the network element, delaying injection of the desired configuration in the network element. In this way, injection that would result in dropped traffic is prevented or efficiently scheduled for a more optimal time.

Clause I. The method of any preceding Clause, wherein the log provided by the network element comprises an indication of a deactivation of the current configuration, and wherein the log is generated by monitoring of the test instance of the network element. In this way, a way of indicating the deactivation of a current configuration is provided.

Clause J. The method of any preceding Clause, wherein initiating creating the test instance of the network element comprises injecting the current configuration of the network element in the test instance of the network element. In this way, a deactivation associated with a log of a test instance accurately reflects an actual deactivation of current configuration that is likely to occur should the desired configuration be injected into the live network element.

Clause K. The method of any preceding Clause, wherein the network element is a session border controller. In this way, a session border controller has desired configuration for the session border controller policed, enabling a reduction in dropped traffic when applying configuration, where a large amount of traffic is likely to flow via the session border controller.

Clause L. An apparatus comprising:
a processor;
a memory storing instructions that, when executed by the processor, perform a method for policing network element configuration injection, comprising:
    receiving a desired configuration for a network element, the network element comprising a current configuration and being in operation in a live communications network;
    prior to injecting the desired configuration in the network element, initiating creating a test instance of the network element in the live communications network, the test instance of the network element having a configuration corresponding to the current configuration of the network element;
    initiating injecting the desired configuration in the test instance of the network element, wherein the test instance of the network element provides a log in response to a deactivation of the configuration of the test instance during applying the desired configuration;
    determining whether the deactivation of the current configuration associated with the log is allowable using at least one rule;
    in response to the deactivation of the current configuration associated with the log being allowable, initiating injecting the desired configuration in the network element. In this way, an apparatus is provided that reduces instances of dropped traffic by a network element, by enabling policing of injection of desired configuration, and therefore allowing injection where this would result in acceptable deactivations of current configuration of the element.

Clause M. The apparatus of Clause L, wherein the desired configuration is a declarative configuration.

Clause N. The apparatus of Clause M, wherein the network element is configured to map the declarative configuration to an imperative configuration for configuring the network element.

Clause O. The apparatus of any of Clauses L to N inclusive, wherein the network element is a 5G telephony network element.

Clause P. The apparatus of any of Clauses L to O inclusive, wherein the network element comprises a first container, wherein the current configuration is associated with the first container, wherein the test instance of the network element is a second container, wherein injecting configuration in the test instance of the network element refers to injecting configuration in the second container, and wherein injecting configuration in the network element refers to injecting configuration in the first container.

Clause Q. The apparatus of any of Clauses L to P inclusive, wherein the method is performed in a Continuous Integration/Continuous Delivery, CI/CD, pipeline, and wherein the initiating the creating the test instance of the network element is performed prior to the desired configuration being provided to an orchestrator that is configured to communicate with the network element.

Clause R. The apparatus of any of Clauses L to Q inclusive, wherein the network element is configured to always converge on a desired configuration injected in the network element.

Clause S. A communications network comprising:
a network element comprising a current configuration; and
an apparatus comprising:
    a processor;
    a memory storing instructions that, when executed by the processor, perform a method for policing network element configuration injection, comprising:
        receiving a desired configuration for the network element, the network element being in operation in a live communications network;
        prior to injecting the desired configuration in the network element, initiating creating a test instance of the network element in the live communications network, the test instance of the network element having a configuration corresponding to the current configuration of the network element;
        initiating injecting the desired configuration in the test instance of the network element, wherein the test instance of the network element provides a log in response to a deactivation of the configuration of the test instance during applying the desired configuration;
        determining whether the deactivation of the configuration associated with the log is allowable using at least one rule;
        in response to the deactivation of the configuration associated with the log being allowable, initiating injecting the desired configuration in the network element.

In this way, an communications network is provided with an apparatus that reduces instances of dropped traffic by a network element, by enabling policing of injection of desired configuration, and therefore allowing injection where this would result in acceptable deactivations of current configuration of the element.

Clause T. The communications network of Clause S, wherein the network element comprises a container, wherein the current configuration is associated with the container, wherein the test instance of the network element is a second container with an associated current configuration, wherein injecting configuration in the test instance of the network element refers to injecting configuration in the second container, and wherein injecting configuration in the network element refers to injecting configuration in the container.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method for policing network element configuration injection, comprising:

receiving a desired configuration for a network element, the network element comprising a current configuration and being in operation in a live communications network;

prior to injecting the desired configuration in the network element, initiating creation of a test instance of the network element in the live communications network, the test instance of the network element having a configuration corresponding to the current configuration of the network element;

initiating injection of the desired configuration in the test instance of the network element, wherein the test instance of the network element provides a log in response to a deactivation of the configuration of the test instance during applying the desired configuration;

determining whether the deactivation of the configuration associated with the log is allowable using at least one rule; and in response to the deactivation of the configuration associated with the log being allowable, initiating injection of the desired configuration in the network element.

2. The method of claim 1, wherein the desired configuration is a declarative configuration.

3. The method of claim 2, wherein the network element is configured to map the declarative configuration to an imperative configuration for configuring the network element.

4. The method of claim 1, wherein the network element is a telephony network element.

5. The method of claim 1, wherein the network element comprises a first container, wherein the current configuration is associated with the first container, wherein the test instance of the network element is a second container, wherein injecting configuration in the test instance of the network element comprises injecting configuration in the second container, and wherein injecting configuration in the network element comprises injecting configuration in the first container.

6. The method of claim 5, wherein the method is performed in a Continuous Integration/Continuous Delivery (CI/CD) pipeline, and wherein the initiating the creation of the test instance of the network element is performed prior to the desired configuration being provided to an orchestrator that is configured to communicate with the network element.

7. The method of claim 1, wherein the network element is configured to converge on a desired configuration injected in the network element.

8. The method of claim 1, further comprising in response to the deactivation of the current configuration associated with the log being unallowable, performing at least one of:

preventing injection of the desired configuration in the network element, or delaying injection of the desired configuration in the network element.

9. The method of claim 1, wherein the log provided by the network element comprises an indication of a deactivation of the current configuration, and wherein the log is generated by monitoring of the test instance of the network element.

10. The method of claim 1, wherein initiating creation of the test instance of the network element comprises injecting the current configuration of the network element in the test instance of the network element.

11. The method of claim 1, wherein the network element is a session border controller.

12. An apparatus comprising:

a processor;

a memory storing instructions that, when executed by the processor, perform operations for policing network element configuration injection, the operations comprising:

receiving a desired configuration for a network element communicatively coupled to a communications network, the network element comprising a current configuration;

prior to injecting the desired configuration in the network element, initiating creation of a test instance of the network element in the communications network, the test instance of the network element having a configuration corresponding to the current configuration of the network element;

initiating injection of the desired configuration in the test instance of the network element, wherein the test instance of the network element is configured to provide a log in response to a deactivation of the configuration of the test instance during application of the desired configuration;

determining whether the deactivation of the current configuration associated with the log is allowable using at least one rule; and in response to the deactivation of the current configuration associated with the log being allowable, initiating injection of the desired configuration in the network element.

13. The apparatus of claim 12, wherein the desired configuration is a declarative configuration.

14. The apparatus of claim 13, wherein the network element is configured to map the declarative configuration to an imperative configuration for configuring the network element.

15. The apparatus of claim 12, wherein the network element is a 5G telephony network element.

16. The apparatus of claim 12, wherein the network element comprises a first container, wherein the current configuration is associated with the first container, wherein the test instance of the network element is a second container, wherein injecting configuration in the test instance of the network element comprises injecting configuration in the second container, and wherein injecting configuration in the network element comprises injecting configuration in the first container.

17. The apparatus of claim 16, wherein the network element is associated with a Continuous Integration/Continuous Delivery (CI/CD) pipeline, and wherein the initiating the creation of the test instance of the network element is performed prior to the desired configuration being provided to an orchestrator that is configured to communicate with the network element.

18. The apparatus of claim 12, wherein the network element is configured to converge on a desired configuration injected in the network element.

19. A communications network comprising:

a network element comprising a current configuration; and an apparatus comprising:

a processor;

a memory storing instructions that, when executed by the processor, perform operations for policing network element configuration injection, the operations comprising:

receiving a desired configuration for the network element;

prior to injecting the desired configuration in the network element, initiating creation of a test instance of the network element in the communications network, the test instance of the network element having a configuration corresponding to the current configuration of the network element;

initiating injection of the desired configuration in the test instance of the network element, wherein the test instance of the network element is configured to provide a log in response to a deactivation of the configuration of the test instance during applying the desired configuration;

determining whether the deactivation of the configuration associated with the log is allowable using at least one rule; and in response to the deactivation of the configuration associated with the log being allowable, initiating injection of the desired configuration in the network element.

20. The communications network of claim 19, wherein the network element comprises a first container, wherein the current configuration is associated with the first container, wherein the test instance of the network element is a second container with an associated current configuration, wherein injecting configuration in the test instance of the network element comprises injecting configuration in the second container, and wherein injecting configuration in the network element comprises injecting configuration in the first container.

* * * * *